United States Patent
Willis et al.

(10) Patent No.: US 6,492,466 B2
(45) Date of Patent: Dec. 10, 2002

(54) INCREASED THROUGHPUT IN THE MANUFACTURE OF ANIONIC POLYMERS BY REDUCTION IN POLYMER CEMENT VISCOSITY THROUGH THE ADDITION OF METAL ALKYLS

(75) Inventors: Carl Lesley Willis, Houston, TX (US); Robert Charles Bening, Katy, TX (US); Peter Taylor Murany, Sugar Land, TX (US); Steven Jon Weddle, Houston, TX (US); Dale Lee Handlin, Jr., Houston, TX (US)

(73) Assignee: Kraton Polymers U.S. LLC, Houston, TX (US)

( * ) Notice: Subject to any disclaimer, the term of this patent is extended or adjusted under 35 U.S.C. 154(b) by 0 days.

(21) Appl. No.: 10/106,737

(22) Filed: Mar. 26, 2002

(65) Prior Publication Data

US 2002/0143115 A1 Oct. 3, 2002

Related U.S. Application Data

(62) Division of application No. 09/537,500, filed on Mar. 29, 2000, now Pat. No. 6,391,981.
(60) Provisional application No. 60/130,785, filed on Apr. 23, 1999.

(51) Int. Cl.$^7$ ............................................. C08F 279/00
(52) U.S. Cl. ....................................... 525/315; 525/314
(58) Field of Search ................................. 525/315, 314

(56) References Cited

U.S. PATENT DOCUMENTS

| | | | |
|---|---|---|---|
| 3,631,006 A | 12/1971 | Hawkins | 260/80.7 |
| 4,429,090 A | 1/1984 | Hall | 526/177 |
| 4,429,091 A | 1/1984 | Hall | 526/181 |
| 4,473,661 A | 9/1984 | Hall | 502/153 |
| 4,476,240 A | 10/1984 | Hall et al. | 502/155 |
| 4,480,075 A | 10/1984 | Willis | 525/247 |
| 4,518,753 A | 5/1985 | Richards et al. | 526/177 |
| 4,520,123 A | 5/1985 | Hall | 502/153 |
| 4,530,984 A | 7/1985 | Hall | 526/177 |
| 4,591,624 A | 5/1986 | Hall | 526/177 |
| 4,889,900 A | 12/1989 | DuBois | 526/77 |
| 5,063,190 A | 11/1991 | Hargis et al. | 502/157 |
| 5,202,499 A | 4/1993 | Hargis et al. | 568/587 |
| 5,216,181 A | 6/1993 | Hargis et al. | 549/513 |
| 5,331,058 A | 7/1994 | Shepherd et al. | 525/332.3 |
| 5,376,745 A | 12/1994 | Handlin, Jr. et al. | 526/178 |
| 5,397,851 A | 3/1995 | Knauf et al. | 526/92 |
| 5,412,045 A | 5/1995 | Osman et al. | 526/133 |
| 5,416,168 A | 5/1995 | Willis et al. | 525/333.2 |
| 5,610,227 A | 3/1997 | Antkowiak et al. | 524/572 |
| 5,610,277 A | 3/1997 | Bassi et al. | 530/374 |
| 5,665,827 A | 9/1997 | Hall | 525/280 |
| 5,677,399 A | 10/1997 | Hall | 526/83 |
| 5,700,888 A | 12/1997 | Hall | 526/190 |
| 5,936,029 A | 8/1999 | Hall | 524/572 |
| 6,271,324 B1 | 8/2001 | Jungling et al. | 526/174 |

FOREIGN PATENT DOCUMENTS

| | | | |
|---|---|---|---|
| WO | WO 97/33923 | 9/1997 | C08F/12/08 |
| WO | WO 98/07765 | 2/1998 | C08F/12/08 |
| WO | WO 98/07766 | 2/1998 | C08F/212/04 |

OTHER PUBLICATIONS

"Solid–State NMR or Aromatic Polyamides," by S. A. Curran, C. P. LaClair, and S. M. Aharoni, *Macromolecules 1991,* 24, pp. 5903–5909.

"Towards the Control of the Reactivity in High Temperature Bulk Anionic Polymerization of Styrene, 1," by P. Desbois, M. Fontanille, A. Deffieux, V. Warzelhan, S. Latsch, C. Schade, *Macromol. Chem. Phys 200,* (1999) pp. 621–628.

"Controlled Anionic Polymerization of tert–Butyl Acrylate With Diphenylmethylpotassium in the Presence of Triethylborane," by T. Ishizone, K. Yoshimura, E. Yanase, and S. Nakahama, *Macromolecules 1999,* 32, pp. 955–957.

"Stereospecific Living Polymerization and Copolymerization of Methacrylate and Their Use for Construction of Stereoregular Chain Architecture," by K. Hatada, T. Kitayama, and K. Ute, *Makromol. Chem., Macromol. Symp. 70/71,* (1993) pp. 57–66.

"Identifying the Nature of the Active Species in the Polymerization of Methacrylates: Inhibition of Methyl Methacrylate Homopolymerizations and Reactivity Ratios for . . . ," by D. M. Haddleton, M. C. Crossman, K. H. Hunt, C. Topping, C. Waterson, and K. G. Suddaby, *Macromolecules 1997,* 30, pp. 3992–3998.

Mechanism of Anionic Polymerization of (Meth)acrylates in the Presence of Aluminum Alkyls, 6. Polymerization of Primary and Tertiary Acrylates, by B. Schmitt, H. Schlaad, and A. H. E. Muller, *Macromolecules,* vol. 31, No. 6, Mar. 24, 1998, pp. 1705–1709.

*Primary Examiner*—Christopher Henderson

(57) ABSTRACT

The present invention is an improvement upon the known method of anionically polymerizing monomers by contacting the monomers with an anionic polymerization initiator which is an organo-substituted alkali metal compound. The improvement comprises decreasing the viscosity of the polymer cement by adding at least 0.01 equivalent of a metal alkyl compound per equivalent of alkali metal initiator if the metal alkyl is added before or at the beginning of polymerization. If the metal alkyl is added during the polymerization or after but before the living polymer is terminated, then at least 0.01 equivalent of the metal alkyl compound per equivalent of living polymer chain ends is should be used. The alkyl groups of the metal alkyl are chosen such that they do not exchange with the organo substituents of the alkali metal, which can be the living polymer chain ends or the organo substituents of the initiator. To avoid this undesired exchange reaction, the alkyl groups of the metal alkyl compound are selected to be more basic and/or less bulky or both than the organo substituents of the alkali metal compound.

15 Claims, No Drawings

INCREASED THROUGHPUT IN THE MANUFACTURE OF ANIONIC POLYMERS BY REDUCTION IN POLYMER CEMENT VISCOSITY THROUGH THE ADDITION OF METAL ALKYLS

CROSS-REFERENCE TO RELATED APPLICATIONS

This application is a division of U.S. patent application Ser. No. 09/537,500, filed Mar. 29, 2000 now U.S. Pat. No. 6,391,981, which claims the benefit of U.S. provisional patent application Ser. No. 60/130,785 filed Apr. 23, 1999.

BACKGROUND OF THE INVENTION

Field of the Invention

This invention relates to the manufacture of polymers by anionic polymerization of monomers, especially conjugated dienes and/or vinyl aromatic hydrocarbons, in a hydrocarbon solvent. More particularly, this invention relates to an improvement in such a process whereby the throughput of the manufacturing system is increased by reducing the viscosity of the polymer cement (the solution of the anionic polymer in the hydrocarbon solvent).

Anionic polymers, including polymers of conjugated dienes and/or vinyl aromatic hydrocarbons, have been produced by numerous methods. However, anionic polymerization of such or other monomers in the presence of an anionic polymerization initiator is the most widely used commercial process. The polymerization is carried out in an inert solvent such as hexane, cyclohexane, or toluene and the polymerization initiator is commonly an organo alkali metal compound, especially alkyl lithium compounds. The solvent used is almost always a non-polar hydrocarbon because such solvents are much better solvents for the polymers of such monomers, especially conjugated diene polymers or blocks when they form a part of block copolymers.

As the polymer is created from the monomers, a solution of the polymer forms in the inert hydrocarbon solvent. This solution is called the polymer cement. These polymerizations may be carried out at a variety of solids contents and it is reasonably obvious that if the process can be run at high solids content, the manufacturing cost will be decreased because the cost of solvent will be decreased and more polymer can be produced in a given amount of time.

Unfortunately, with polymer cements of anionic polymers, one of the most significant rate limiting aspects is the viscosity of the polymer cement. This is especially true in the manufacture of block copolymers of conjugated dienes such as butadiene or isoprene and vinyl aromatic hydrocarbons such as styrene.

Solutions of living anionic polymers, living polymer cements, tend to be higher in viscosity than their terminated analogs, terminated polymer cements. The higher viscosity of living polymer cements in polymerization tends to limit the production capacity of equipment used to make these products. Higher concentrations of terminated polymer solutions could be pumped and mixed with the existing equipment but polymerization at these higher concentrations is not possible due to the prohibitively high viscosities of the living polymer solutions. Production rates are limited by the viscosity of the living anionic polymer solutions in polymerization since the polymer chain must be kept "living", i.e., not terminated, until the desired molecular weight is achieved.

SUMMARY OF THE INVENTION

The present invention is an improvement upon the known method of anionically polymerizing monomers by contacting the monomers with an anionic polymerization initiator which is an organo-substituted alkali metal compound. The improvement comprises decreasing the viscosity of the polymer cement by adding at least 0.01 equivalent of a metal alkyl compound per equivalent of alkali metal initiator if the metal alkyl is added before or at the beginning of polymerization. If the metal alkyl is added during the polymerization or after but before the living polymer is terminated, then at least 0.01 equivalent of the metal alkyl compound per equivalent of living polymer chain ends (i.e., styryl-lithium or dienyl-lithium moiety) should be used. Preferably, in both cases, from 0.01 to 1.5 equivalents is used and most preferably, 0.01 to 1.0 equivalents.

The metal alkyl is preferably added during the polymerization but it can be added before polymerization begins. It can also be added subsequent to polymerization before termination if desired. The alkyl groups of the metal alkyl are chosen such that they do not exchange with the organo substituents of the alkali metal, which can be the living polymer chain ends or the organo substituents of the initiator. To avoid this undesired exchange reaction, the alkyl groups of the metal alkyl compound are selected to be more basic and/or less bulky or both than the organo substituents of the alkali metal compound. The organo substituents of the alkali metal compound are aliphatic, cycloaliphatic, aromatic, or alkyl-substituted aromatic and include multi-functional initiators such as the sec-butyl lithium adduct of diisopropenyl. In a preferred embodiment of the invention, the organo-substituted alkali metal species at the time of the addition of the metal alkyl is a styryl-lithium or dienyl-lithium moiety. The preferred metal alkyl for use herein is triethyl aluminum.

DETAILED DESCRIPTION OF THE INVENTION

This invention relates to anionic polymers and processes for polymerizing them by anionic polymerization using mono- or di- or multi-alkali metal, generally lithium, initiators. Sodium or potassium initiators can also be used. For instance, polymers which can be made according the present invention are those from any anionically polymerizable monomer, including random and block copolymers with styrene, dienes, polyether polymers, polyester polymers, polycarbonate polymers, polystyrene, acrylics, methacrylics, etc. Polystyrene polymers hereunder can be made in the same manner as the polydiene polymers and can be random or block copolymers with dienes.

In general, when solution anionic techniques are used, copolymers of conjugated diolefins, optionally with vinyl aromatic hydrocarbons, are prepared by contacting the monomer or monomers to be polymerized simultaneously or sequentially with an anionic polymerization initiator such as group IA metals, their alkyls, amides, silanolates, naphthalides, biphenyls or anthracenyl derivatives. It is preferred to use an organo alkali metal (such as lithium or sodium or potassium) compound in a suitable solvent at a temperature within the range from about –150° C. to about 150° C., preferably at a temperature within the range from about –70° C. to about 100° C. Particularly effective anionic polymerization initiators are organo lithium compounds having the general formula:

$$RLi_n$$

wherein R is an aliphatic, cycloaliphatic, aromatic or alkyl-substituted aromatic hydrocarbon radical having from 1 to about 20 carbon atoms and n is an integer of 1 to 4. The organolithium initiators are preferred for polymerization at higher temperatures because of their increased stability at elevated temperatures.

Other initiators that can be used herein include multifunctional initiators. There are many multifunctional initiators that can be used herein. The di-sec-butyl lithium adduct of m-diisopropenyl benzene is preferred because of the relatively low cost of the reagents involved and the relative ease of preparation. Diphenyl ethylene, styrene, butadiene, and isoprene will all work well to form dilithium (or disodium) initiators by the reaction:

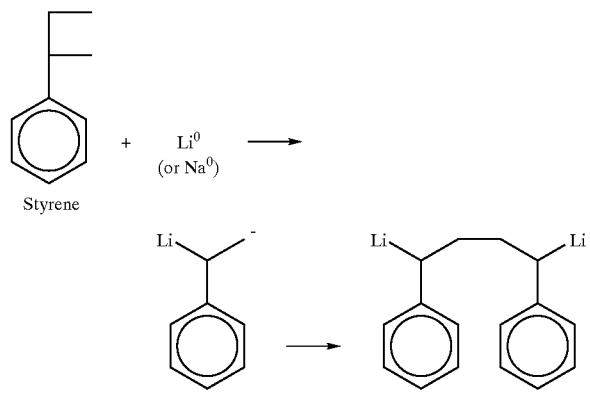

Still another compound which will form a diinitiator with an organo alkali metal such as lithium and will work herein is the adduct derived from the reaction of 1,3-bis(1-phenylethenyl)benzene (DDPE) with two equivalents of a lithium alkyl:

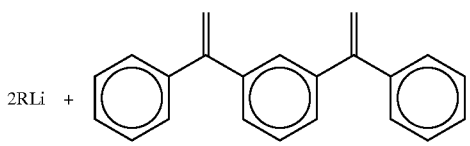

Related adducts which are also known to give effective dilithium initiators are derived from the 1,4-isomer of DDPE. In a similar way, it is known to make analogs of the DDPE species having alkyl substituents on the aromatic rings to enhance solubility of the lithium adducts. Related families of products which also make good dilithium initiators are derived from bis[4-(1-phenylethenyl)phenyl]ether, 4,4'-bis(1-phenylethenyl)-1,1'-biphenyl, and 2,2'-bis[4-(1-phenylethenyl)-phenyl]propane (See L. H. Tung and G. Y. S. Lo, Macromolecules, 1994, 27, 1680–1684 (1994) and U.S. Pat. Nos. 4,172,100, 4,196,154, 4,182,818, and 4,196,153 which are herein incorporated by reference). Suitable lithium alkyls for making these dilithium initiators include the commercially available reagents (i.e., sec-butyl and n-butyl lithium) as well as anionic prepolymers of these reagents, polystyryl lithium, polybutadienyl lithium, polyisopreneyl lithium, and the like.

The polymerization is normally carried out at a temperature of 20 to 80° C. in a hydrocarbon solvent. Suitable solvents include straight and branched chain hydrocarbons such as pentane, hexane, octane and the like, as well as alkyl-substituted derivatives thereof; cycloaliphatic hydrocarbons such as cyclopentane, cyclohexane, cycloheptane and the like, as well as alkyl-substituted derivatives thereof; aromatic and alkyl-substituted derivatives thereof; aromatic and alkyl-substituted aromatic hydrocarbons such as benzene, naphthalene, toluene, xylene and the like; hydrogenated aromatic hydrocarbons such as tetralin, decalin and the like; linear and cyclic ethers such as dimethyl ether, methylethyl ether, diethyl ether, tetrahydrofuran and the like.

It is known to polymerize such polymers with multifunctional initiators and then cap the living chain ends with a capping agent such as described in U.S. Pat. Nos. 4,417,029, 4,518,753, and 4,753,991, which are herein incorporated by reference. When such polymers formed with multifunctional initiators are polymerized and then capped, a polymer gel often forms. It is the subject of an earlier invention to prevent the formation of such gel by the addition of a trialkyl aluminum compound during the polymerization/capping process. The present invention only relates to reduction in viscosity of living polymer cement on addition of a metal alkyl and the improvement in polymerization process throughput that results from this viscosity reduction when using initiators of the type described above under the conditions described above and does not relate to the prevention of polymer gels during the manufacture of capped polymers using multifunctional initiators.

The presence of C-Li chain ends (lithium being used herein as an example of an alkali metal used in the initiator) in the living polymer cements seems to contribute to the viscosity of the solution. C-Li chain ends are the points in the molecule of the initiator where the carbon-lithium bond is located and at which the propagation of the polymer chain occurs and from which the polymer may continue to grow until it is terminated. It is known that lithium alkyls form aggregates in hydrocarbon solution. These aggregates are stabilized by metal-metal bonding between the lithium centers in the lithium alkyl moieties. Such aggregates likely are present in living anionic polymer solutions as well. The equilibrium between aggregated and unassociated polymer chains appears to strongly favor the aggregated species. The unassociated species, though present as a minor component of the mixture, appears to be the predominant and perhaps the only center for propagation of polymerization. For this reason, it is important that the exchange of polymer chains between aggregated and unassociated centers is fast relative to the rate of polymerization.

Aggregation of Polymer-Li Centers

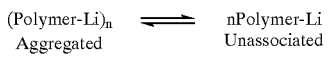

(Polymer-Li)$_n$ ⇌ nPolymer-Li
Aggregated      Unassociated

The viscosity of a polymer solution is directly related to the molecular weight of the dissolved polymer. The aggregated moiety is n times larger in mass than the unassociated polymer, n representing the number of centers in the aggregate. For this reason, it is not surprising that the viscosity of a living anionic polymer cement (mostly aggregates) is higher than that of its terminated analog (as a terminated chain would have no C-Li centers, it is reasonable to assume that it will not be aggregated). The strong association of the C-Li chain ends in living anionic polymer solutions is likely the source of the very high viscosity for such solutions.

We have discovered that addition of selected metal alkyls to solutions of living anionic polymers can afford a substantial reduction in the viscosity of the living anionic polymer cement. It is preferred that the metal alkyl is selected form the group of metal alkyls that interact with C-Li centers to form metal "ate" complexes. As an example of this type of interaction, see the equation below in which an aluminum alkyl is used as an example of the preferred type of metal alkyl and a living anionic polymer chain end as the preferred type of aggregation prone lithium species. The "ate complex" is in equilibrium with the unassociated polymer chain. It is important that this complex is formed reversibly as the "ate complex" is not capable of either initiating or propagating the polymerization of monomer.

Aluminate Complex Formation

Polymer-Li + R$_3$Al ⇌ Polymer-AlR$_3$Li
Aluminate

It is our hypothesis that the added metal alkyl reduces the viscosity of a living anionic polymer solution by linking the two equilibria discussed above. See the equation shown below.

Mechanism for Reducing the Degree of Aggregation

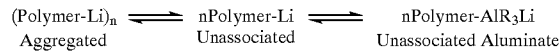

(Polymer-Li)$_n$ ⇌ nPolymer-Li ⇌ nPolymer-AlR$_3$Li
Aggregated    Unassociated    Unassociated Aluminate The formation of the aluminate complex effectively drains away the aggregated polymer lithium moiety. The equilibrium concentration of aggregated species is reduced as more of the aluminate complex is formed. As the aluminate moiety is unassociated, this mechanism effectively reduces the concentration of aggregated species that is the principle contributor to viscosity in the living polymer cement. In this way, the viscosity of the living polymer cement is minimized. As more aluminum alkyl is added, more aggregated species are eliminated, up to the limit where all of the polymer is associated with the aluminum center. This appears to occur at about one aluminum alkyl per polymer lithium center. Added aluminum alkyl beyond one per polymer lithium center seems to have a diminished affect on the reduction of the viscosity of the living polymer cement and at least 0.01 equivalents of metal alkyl per 100 alkali metal centers must be added before any appreciable effect is noticed. Additional amounts of metal alkyl may be added but they do not significantly further reduce the viscosity of the cement while adding additional cost and reducing the rate of polymerization. Therefore, it is preferred that no more than 1.5 equivalents of metal alkyl be used, most preferably, no more than 1 equivalent. When the metal alkyl is added during or after polymerization, the basis is equivalents of living polymer chain ends. When the metal alkyl is added before or at the beginning of polymerization, the basis is equivalents of alkali metal initiator.

The selection of the alkyl on the metal center is important for the effective use of metal alkyls for the reduction of viscosity of a living anionic polymer cement if additional polymerization on the living anionic center is desired. As the formation of the metal ate complex is reversible, alkyl groups must be selected which are not prone to dissociation to form RLi molecules. As outlined below using an aluminum alkyl for illustrative purposes, dissociation of the aluminate complex to form RLi and an aluminum alkyl attached to the polymer chain end is effectively a chain transfer mechanism for the polymerization reaction. The living polymerization center, a C-Li moiety, has been transferred from the end of the polymer chain to the alkyl which was originally on the aluminum species.

Undesired "Chain Transfer" Reaction

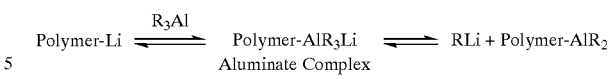

Polymer-Li ⇌ Polymer-AlR$_3$Li ⇌ RLi + Polymer-AlR$_2$
    R$_3$Al    Aluminate Complex The polymer aluminum alkyl moiety will be inactive under typical conditions for anionic polymerization of monomers. This polymer chain is essentially "dead" for purposes of additional polymerization reactions. If the newly formed RLi species is not an effective initiator for polymerization of anionic monomers, the consequence of this reaction will be to stop the consumption of monomer and terminate polymerization. If, on the other hand, the newly formed RLi species is an effective polymerization initiator, this reaction provides a route to generation of a new anionic polymer, one not attached to the starting polymer chain.

For typical anionic polymerization processes that are often used to make block copolymers having well defined structures, all of these reactions are undesirable. Chain transfer processes like those described above interfere with the orderly process normally used for making well defined block copolymers with living polymerization systems. For such processes, it is desirable to minimize or eliminate these side reactions. It is desirable to select alkyl groups on the metal alkyls that are being used for purposes of reducing the living anionic polymer cement viscosity such that Polymer-Li species are the predominant, and desirably the only, species which are not associated with a metal ate complex.

At equilibrium, alkyl groups that are more basic will favor being attached to the more electronegative metal, the metal alkyl. Less basic alkyls will favor being attached to more electropositive metal, the alkali metal alkyl. The more electronegative metal is better able to stabilize the charge of a strongly basic alkyl anion. Consider the example shown below for the distribution of alkyl groups R and R' between lithium and aluminum centers:

Distribution of Alkyl Groups Between Li and Al Centers

RLi + R'$_3$Al ⇌ RAlR'3Li ⇌ R'Li + RAlR'$_2$
Aluminate

The selection rule for whether RLi or R'Li is the predominant unassociated lithium alkyl species present at equilibrium depends, in part, on which alkyl is more basic. A discussion of basicity in this context, and a table comparing the basicity of alkyl groups can be found in Chapter 8 of Advance Organic Chemistry, 4$^{th}$ Ed by Jerry March (Wiley & Sons, 1992), incorporated by reference. The basicity of alkyl moieties has been shown to follow the general trend outlined below:

Selection Rule for the Distribution of Alkyl Centers Between Li and Al

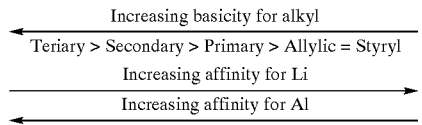

Increasing basicity for alkyl
Teriary > Secondary > Primary > Allylic = Styryl
Increasing affinity for Li
Increasing affinity for Al In a competition for the two metal centers, it is also reasonable to expect that more bulky alkyls will prefer to be attached to the monofunctional lithium center while less sterically encumbered alkyls will select the more highly substituted aluminum center.

In a practical application of these concepts, consider the case where a living polymer derived from the anionic polymerization of styrene or diene (styryl-lithium or allyl-lithium chain end) is treated with triethylaluminum (primary alkyl group). Formation of the ate complex should be facile but exchange of alkyls between the metal centers is not favored. The least basic and more bulky alkyl group, styryl-lithium or allyl-lithium, will stay on lithium while the more basic and less sterically encumbered alkyl, ethyl, will have an affinity for the aluminum center. This is a preferred system for viscosity reduction in a living anionic polymer cement where subsequent polymerization is desired. Aluminum alkyls having secondary or tertiary alkyls should work as well. While simple tertiary alkyl groups, such as t-butyl, can be considered bulky, these substituents are highly basic (as defined above) and would not be expected to participate in chain transfer reaction. Preferred embodiments include all combinations of living chains derived from typical anionically—polymerizable monomers such as butadiene, isoprene and styrene and most commercially—available trialkylaluminum compounds, including triethylaluminum, trimethylaluminum, triisobutylaluminum, tri-n-butylaluminum and tri-n-hexylaluminum. Arylaluminum compounds such as triphenylaluminum would be less preferred, as the phenyl ring is both less basic and fairly bulky. The addition of such a compound during polymerization of styrene or dienes may result in chain transfer. These same trends would expect to be observed for other metal alkyls that form ate complexes, such as magnesium and zinc alkyls.

Conversely, treatment of the s-butyllithium (secondary alkyl) polymerization initiator with triethylaluminum (primary alkyl) followed by addition of monomer (thus, addition of the metal alkyl before polymerization) should not be an effective polymerization system. This hypothesis was tested as outlined in a comparative example. As the ratio of triethylaluminum to sec-butyllithium was increased, the efficiency of the system for the initiation of the polymerization of styrene was reduced until at 1 mole of triethylaluminum for each mole of sec-butyllithium, the system was not able to initiate the polymerization of styrene. For this combination of alkyls, the more basic alkyl, sec-butyl, should have an affinity for Al while the less basic primary alkyl, ethyl, would be expected to favor the lithium center. When a molar equivalent of triethylaluminum has been added, all of the sec-butyllithium has been converted to ethyllithium which is inactive as a polymerization initiator. Since ethyllithium is an ineffective initiator of styrene polymerization, the alkyl exchange reaction has worked to remove the only effective polymerization initiator in the system, sec-butyllithium.

If the objective is to retain the living nature of the polymerization and reduce the viscosity of the cement, then more care must be exercised in the selection of the metal alkyl that is to be added to the Polymer-Li solution. In particular, the alkyl group on the "ate" complex forming metal alkyl that is to be added must be more basic and/or less bulky than the C-Li chain end (usually styryl-Li or dienyl-Li or allyl-Li) of the living polymer. This additional requirement for the viscosity reduction agent will insure that the undesired side reaction of chain transfer will be avoided or at least minimized. In this way, viscosity reduction can be obtained without a loss in polymerization capability.

Alkyls of aluminum, zinc, boron (especially trialkyls such as triethylborane), and magnesium, and combinations thereof, should all be effective for this purpose. Preferably, the alkyls have from 1 to 20 carbon atoms per alkyl substituent. Preferably, the metal alkyl is selected from the group consisting of trialkyl aluminum, dialkyl magnesium, and dialkyl zinc compounds. Preferred trialkylaluminum compounds are triethylaluminum, trimethylaluminum, tri-n-propylaluminum, tri-n-butylaluminum, triisobutylaluminum, tri-n-hexylaluminum, and trioctylaluminum because these reagents are readily available in commercial quantities. Triethylaluminum is most preferred as it is least expensive on a molar basis. Preferred dialkylmagnesium compounds are butylethylmagnesium, di-n-butylmagnesium, and di-n-hexylmagnesium because these reagents are readily available in commercial quantitites. Preferred dialkylzinc compounds are dimethylzinc, diethylzinc, di-n-propylzinc, diisobutylzinc, and di-n-butylzinc because these reagents are readily available in commercial quantities.

EXAMPLES

Example 1

A general procedure was used to demonstrate how the viscosity of a living anionic polymerization solution could be reduced significantly by the addition of an appropriate amount of trialkylaluminum. A block copolymer mixture of styrene-isoprene-isoprene-styrene triblocks (SIIS) and isoprene-styrene diblocks (IS) was synthesized stepwise in cyclohexane. During the experiment, viscosity data was collected at different points over a number of operating conditions before and after the addition of trialkylaluminum. The viscosity of the living polymer solution was measured in-situ with a capillary tube apparatus. The viscosity measurement was done by pressuring a finite amount of polymer solution through the capillary tube into a sample jar for a measured amount of time while recording the operating pressure and temperature of the reactor.

An appropriate amount of polymerization grade cyclohexane was charged to a well-mixed 20-gallon stainless steel reactor vessel at 30° C. Pressure in the reactor vessel was controlled with nitrogen gas. In Step 1, styrene monomer was charged to the reactor at 30° C. The first gig of sec-butyllithium was then added to the reactor to initiate the anionic polymerization of the living polystyrene blocks (S). The temperature was allowed to increase to 55° C. and the reaction was carried out for about 2 hours. In Step 2a, isoprene monomer was charged to the vessel to react with the polystyrene blocks for about 30 minutes at 65° C. to form living styrene-isoprene diblocks (SI). In Step 2b, a second gig of sec-butyllithium was added to the reactor. More isoprene monomer was then charged to the vessel to react for about 45 minutes at 70° C. to 800° C. The resulting polymer solution contained living styrene-isoprene-isoprene diblocks (SII) and living polyisoprene blocks (I). In Step 3, more styrene monomer was charged to the vessel to react for about 15 minutes at 70° C. to 80° C. The resulting polymer solution contained living styrene-isoprene-isoprene-styrene triblocks (SIIS) and living isoprene-styrene diblocks (IS). The living polymer chains were terminated by adding an appropriate amount of high-grade methanol to the reactor solution.

This experiment was carried out 3 times (Run 1, Run 2 and Run 3). The viscosity of the living polymer solution was measured at various operating conditions before and after the addition of triethylaluminum (TEA) to the reactor. Each gig of TEA to the reactor had a TEA to lithium mole ratio of 0.5:1. Two TEA gigs were done in each run. The second TEA gig brought the total TEA to lithium mole ratio to 1:1. In Run 1, the first gig of TEA was added to the polymer solution at the end of Step 2b. The second gig of TEA was added at the end of Step 3. In Run 2, the first and second gig of TEA was added at the end of Step 3. In Run 3, the first and the second gig of TEA was added at the end of Step 2b.

The materials charged for each run are given in Table 1. The reactor solution viscosity reductions for each run are given in Tables 2, 3 and 4 for Run 1, Run 2 and Run 3, respectively.

TABLE 1

|  |  | Run 1 | Run 2 | Run 3 |
|---|---|---|---|---|
| Step 1 |  |  |  |  |
| Cyclohexane | (kg) | 40.59 | 40.84 | 32.05 |
| Styrene | (kg) | 0.93 | 0.95 | 1.13 |
| sec-BuLi | (g-mole) | 0.089 | 0.089 | 0.106 |
| Step 2a |  |  |  |  |
| Isoprene | (kg) | 5.41 | 5.38 | 6.48 |
| Step 2b |  |  |  |  |
| Solids | (wt %) | 25.1 | 25.0 | 33.8 |
| sec-BuLi | (g-mole) | 0.031 | 0.031 | 0.038 |
| Isoprene | (kg) | 7.28 | 7.30 | 8.79 |
| TEA Gig | (g-mole) | 0.060 | 0.000 | 0.072 |
| TEA Gig | (g-mole) | 0.000 | 0.000 | 0.072 |
| Step 3 |  |  |  |  |
| Solids | (wt %) | 26.8 | 26.7 | 36.0 |
| Styrene | (kg) | 1.24 | 1.23 | 1.60 |
| TEA Gig | (g-mole) | 0.060 | 0.060 | 0.000 |
| TEA Gig | (g-mole) | 0.000 | 0.060 | 0.000 |
| Methanol | (mls) | 21.38 | 21.38 | 25.65 |

TABLE 2

|  |  | Run 1 | | | | | | | |
|---|---|---|---|---|---|---|---|---|---|
|  |  | High Pressure/Shear | | | | Low Pressure/Shear | | | |
| S2b isoprene Step | Sample # | 1 | 4 | 8 | 5 | 2 | 3 | 7 | 6 |
| Temperature | Deg C. | 77.0 | 67.0 | 58.4 | 45.1 | 77.9 | 69.6 | 59.7 | 47.4 |
| Pressure | (Psig) | 76.7 | 72.1 | 74.1 | 71.6 | 45.7 | 43.2 | 43.1 | 41.9 |
| Shear Rate | (1/sec) | 1891 | 1470 | 1226 | 1099 | 944.9 | 778.4 | 701.1 | 591.6 |
| Viscosity | (cp) | 749 | 906 | 1116 | 1203 | 893 | 1025 | 1135 | 1308 |
| Viscosity Change from Previous | (%) | 0% | 0% | 0% | 0% | 0% | 0% | 0% | 0% |
| S2b after TEA Gig 1 | Sample # | 12 | 13 | 10 | 16 | 11 | 14 | 9 | 15 |
| Temperature | Deg C. | 80.6 | 69.6 | 59.3 | 52.7 | 78.8 | 68.7 | 61.8 | 45.1 |
| Pressure | (Psig) | 74.6 | 75.7 | 74.9 | 74.8 | 43.7 | 43.4 | 45.6 | 43.6 |
| Shear Rate | (1/sec) | 3910 | 3387 | 2420 | 2269 | 2012 | 1896 | 1481 | 1393 |
| Viscosity | (cp) | 352 | 413 | 572 | 609 | 401 | 423 | 569 | 578 |
| Viscosity Change from Previous | (%) | −53% | −54% | −49% | −49% | −55% | −59% | −50% | −56% |
| S3 Styrene Step | Sample # | 18 | | | 19 | 17 | | | 20 |
| Temperature | Deg C. | 79.9 | | | 46.1 | 79.5 | | | 45.3 |
| Pressure | (Psig) | 71.5 | | | 73.7 | 44.3 | | | 44.5 |
| Shear Rate | (1/sec) | 3037 | | | 1906 | 1657 | | | 1219 |
| Viscosity | (cp) | 435 | | | 714 | 494 | | | 674 |
| Viscosity Change from Previous | (%) | 23% | | | 17% | 23% | | | 17% |
| S3 after TEA Gig 2 | Sample # | 24 | | | 22 | 23 | | | 21 |
| Temperature | Deg C. | 79.9 | | | 49.8 | 80.1 | | | 47.2 |
| Pressure | (Psig) | 72.6 | | | 74.1 | 42.9 | | | 43.3 |
| Shear Rate | (1/sec) | 5019 | | | 2807 | 2730 | | | 1796 |
| Viscosity | (cp) | 267 | | | 487 | 290 | | | 445 |
| Viscosity Change from Previous | (%) | −39% | | | −32% | −41% | | | −34% |
| S3 after Termination | Sample # | 27 | | | 26 | 28 | | | 25 |
| Temperature | Deg C. | 80.1 | | | 50.7 | 81.7 | | | 50.3 |
| Pressure | (Psig) | 66.9 | | | 68.9 | 42.7 | | | 40.6 |
| Shear Rate | (1/sec) | 6267 | | | 3190 | 3790 | | | 2000 |
| Viscosity | (cp) | 197 | | | 399 | 208 | | | 375 |
| Viscosity Change from Previous | (%) | −26% | | | −18% | −28% | | | −16% |

TABLE 3

|  |  | Run 2 | | | |
|---|---|---|---|---|---|
|  |  | Sample # | | | |
| S2b Isoprene Step |  | 1 | 2 | 3 | 4 |
| Temperature | Deg C | 68.5 | 70.4 | 72.2 | 72.2 |
| Pressure | (Psig) | 72.5 | 45.2 | 27.8 | 12.4 |
| Shear Rate | (1/sec) | 2010 | 1210 | 679.3 | 291.4 |
| Viscosity | (cp) | 666 | 690 | 756 | 786 |
| Viscosity Change from Previous | (%) | 0% | 0% | 0% | 0% |
| S3 Styrene Step |  | 5 | 6 | 7 | 8 |
| Temperature | Deg C | 70.9 | 69.6 | 67.8 | 72.2 |
| Pressure | (Psig) | 72.0 | 47.1 | 27.9 | 14.1 |
| Shear Rate | (1/sec) | 1921 | 1243 | 709.2 | 367.5 |
| Viscosity | (cp) | 692 | 700 | 727 | 709 |
| Viscosity Change from Previous | (%) | 4% | 1% | −4% | −10% |
| S3 after TEA Gig 1 |  | 9 | 10 | 11 | 12 |
| Temperature | Deg C | 71.1 | 68.5 | 70.3 | 72.1 |
| Pressure | (Psig) | 69.5 | 47.2 | 26.3 | 13.6 |
| Shear Rate | (1/sec) | 2828 | 1801 | 1059 | 524.3 |

TABLE 3-continued

Run 2

|  |  | Sample # | | | |
|---|---|---|---|---|---|
|  |  |  |  |  |  |
| Viscosity | (cp) | 454 | 484 | 459 | 479 |
| Viscosity Change from Previous | (%) | −34% | −31% | −37% | −32% |
| S3 after TEA Gig 2 |  | 13 | 14 | 15 | 16 |
| Temperature | Deg C | 71.0 | 68.6 | 69.4 | 68.4 |
| Pressure | (Psig) | 70.3 | 45.3 | 26.6 | 12.3 |
| Shear Rate | (1/sec) | 4285 | 2582 | 1523 | 718.1 |
| Viscosity | (cp) | 303 | 324 | 322 | 316 |
| Viscosity Change from Previous | (%) | −33% | −33% | −30% | −34% |
| S3 after Termination |  | 17 | 18 | 19 | 20 |
| Temperature | Deg C | 70.4 | 69.7 | 69.5 | 70.0 |
| Pressure | (Psig) | 72.6 | 48.1 | 25.9 | 13.2 |
| Shear Rate | (1/sec) | 3894 | 2368 | 1345 | 712.7 |
| Viscosity | (cp) | 344 | 375 | 356 | 342 |
| Viscosity Change from Previous | (%) | 14% | 16% | 10% | 8% |

TABLE 4

Run 3

|  |  | Sample # | | | |
|---|---|---|---|---|---|
| S2a Isoprene Step |  | 1 | 2 | 3 | 4 |
| Temperature | Deg C | 69.7 | 70.9 | 68.8 | 71.4 |
| Pressure | (Psig) | 72.2 | 43.3 | 26.1 | 11.5 |
| Shear Rate | (1/sec) | 2847 | 1690 | 1020 | 462.8 |
| Viscosity | (cp) | 468 | 473 | 473 | 459 |
| Viscosity Change from Previous | (%) | 0% | 0% | 0% | 0% |
| S2b Isoprene Step |  | 5 | 6 | 7 | 8 |
| Temperature | Deg C | 65.5 | 70.9 | No Cement Flow | |
| Pressure | (Psig) | 71.5 | 44.6 |  |  |
| Shear Rate | (1/sec) | 36.75 | 18.78 |  |  |
| Viscosity | (cp) | 35930 | 43860 |  |  |
| Viscosity Change from Previous | (%) | 7572% | 9173% |  |  |
| S2b after TEA Gig 1 |  | 9 | 10 | 11 | 12 |
| Temperature | Deg C | 71.6 | 71.3 | 66.7 | 72.7 |
| Pressure | (Psig) | 73.5 | 44.8 | 23.5 | 9.8 |
| Shear Rate | (1/sec) | 177.4 | 105.6 | 40.08 | 12.11 |
| Viscosity | (cp) | 7652 | 7837 | 10830 | 14940 |
| Viscosity Change from Previous | (%) | −79% | −82% | na | na |
| S2b after TEA Gig 2 |  | 13 | 14 | 15 | 16 |
| Temperature | Deg C | 69.1 | 66.7 | 69.2 | 70.0 |
| Pressure | (Psig) | 73.7 | 47.0 | 26.0 | 13.7 |
| Shear Rate | (1/sec) | 192.5 | 109 | 34.12 | 16.35 |
| Viscosity | (cp) | 7069 | 7960 | 14070 | 15470 |
| Viscosity Change from Previous | (%) | −8% | 2% | 30% | 4% |
| S3 Styrene Step |  | 17 | 18 | 19 | 20 |
| Temperature | Deg C | 69.4 | 69.6 | 69.6 | 69.6 |
| Pressure | (Psig) | 74.0 | 42.9 | 27.1 | 10.2 |
| Shear Rate | (1/sec) | 247.2 | 127.5 | 77.12 | 20.29 |
| Viscosity | (cp) | 5527 | 6213 | 6489 | 9282 |
| Viscosity Change from Previous | (%) | −22% | −22% | −54% | −40% |
| S3 after Termination |  | 21 | 22 | 23 | 24 |
| Temperature | Deg C | 69.5 | 69.5 | 69.5 | 69.5 |
| Pressure | (Psig) | 74.0 | 46.1 | 25.8 | 12.0 |
| Shear Rate | (1/sec) | 265.4 | 156 | 75.2 | 30.29 |
| Viscosity | (cp) | 5149 | 5458 | 6335 | 7317 |
| Viscosity Change from Previous | (%) | −7% | −12% | −2% | −21% |

Example 2

A series of polymers, most were block copolymers of styrene and butadiene, were prepared under well controlled conditions. The anionic polymerization reactions were at constant temperature with each polymerization step (block synthesis) targeted at a monomer charge sufficient to make a polymer segment of 5,000 molecular weight at an initial monomer concentration of 5% wt.

Aliquots of the polymerizing mixture were collected at timed intervals from the initial addition of monomer. These aliquots were quenched and assayed for solids level (by drying a known weight of sample to a constant polymer weight). This information was used to determine the level of conversion of monomer to polymer as a function of time. Analysis of this information assuming pseudo-first order kinetics for the rate of disappearance of monomer gave the rate constants shown in the attached table.

As noted in the table, triethylaluminum (TEA) was added to some of the block copolymerization reactions at either 50 mol % basis C-Li (Al/Li=0.5 (mol/mol)) or 100 mol % basis C-Li (Al/Li=1.0 (mol/mol)) to test the effect of added aluminum alkyl on anionic polymerization activity. In some instances, the aluminum alkyl was added to the s-BuLi initiator. In others, it was added after styrene polymerization was complete (added to a living styryl-lithium system). In others, it was added after polymerization of butadiene was complete (added to a living butadienyl-lithium system).

In a representative example (24219-95), 0.57 gal of polymerization grade cyclohexane was charged, under an inert nitrogen atmosphere, to a 1 gallon stainless steel autoclave. The Step I monomer was charged to the reactor, 100 g of polymerization grade butadiene. The solution was heated with stirring to 55° C. The initiator was added to start polymerization, 11.92 g of 10.86% wt solution of s-BuLi in cyclohexane. The polymerization temperature was controlled at 55° C. Using the time at which the s-BuLi was added to the reactor as the starting point, aliquots of the polymerizing solution were collected at elapsed intervals of 4, 20, 30, and 60 minutes. The samples were taken into bottles containing an excess of the quenching reagent, methanol. The autoclave was then heated to 55° C. The living polybutadiene was treated with 4.41 g of a 26% wt solution of triethylaluminum (TEA) in hexane. This was sufficient TEA to react with half of the living dienyl-Li chain ends. The Step II monomer was charged to the reactor, 100 g of polymerization grade styrene. The temperature was controlled at 55° C. Kinetic samples were collected at intervals of 4, 20, 30, and 60 minutes after the addition of the Step II monomer. As noted above, these samples were collected in bottles containing an excess of methanol, the quenching reagent.

The solution containing the living polybutadiene-polystyrenyl-lithium copolymer (B-S-Li) with sufficient TEA to have formed an "ate" complex with half of the living polymer chain ends was treated with the Step III monomer, 100 g of polymerization grade butadiene. The polymerization temperature was controlled at 55° C. Aliquots of the living polymerization solution were collected at intervals 4, 20, 30, and 60 minutes following the addition of the Step III monomer. As noted above, these samples were quenched immediately to stop further polymerization. At this point, a butadiene-styrene-butadiene triblock copolymer had been prepared. The samples collected during the three polymerization steps were analyzed affording the data in the attached table. Variations of this procedure gave the data in the attached table. k is the pseudo first order rate constant. The data show that polymerization can proceed under the conditions of this invention.

autoclave which made any color or viscosity changes easy to observe. Unless otherwise specified, polymerizations were carried out at a temperature of about 35° C. to 40° C., adjusting charges for intended solids, according to the following procedure: 350 grams of cyclohexane and 100 grams of diethyl ether were charged to the reactor and allowed to equilibrate to the desired temperature. 100 grams of butadiene were added. 203 grams of initiator solution was then added from a sample bomb, resulting in a temperature increase of about 10° C. to 20° C. After about 30 to 40 minutes, another 50 grams of butadiene was added. A third 50 g. aliquot was added after an additional 15 to 20 minutes. After a total reaction time of about 90 to 120 minutes (estimated to be about 8 to 10 half-lives), 57 grams of 25%

TABLE 5

| Experiment number | Block copolymer sequence | Monomer type | Ether (Y/N) | Pzn Temp (C.) | TEA (Y/N) | TEA/Li (mol/mol) | Block MW (GPC) | k |
|---|---|---|---|---|---|---|---|---|
| 24219-77 | Step I | styrene | N | 35 | N | 0 | 5300 | 0.0804 |
| | Step II | butadiene | " | 40–60 | " | " | 8400 | 0.0481 |
| 24219-79 | Step I | styrene | N | 35 | N | 0 | 5259 | 0.1197 |
| | Step II | butadiene | " | 48 | " | " | 7978 | 0.0301 |
| 24219-81 | Step I | styrene | N | 35 | Y | 0.5 | 8499 | 0.0391 |
| | Step II | butadiene | " | 50 | " | " | 11860 | 0.02 |
| 24219-83 | Step I | styrene | N | 35 | N | 0 | 4939 | 0.0949 |
| | Step II | butadiene | " | 55 | " | " | 6329 | 0.0782 |
| | Step III | styrene | " | 35 | " | " | ~1000 | 0.1152 |
| 24219-85 | Step I | styrene | N | 35 | Y | 0.5 | 8259 | 0.0568 |
| | Step II | butadiene | " | 55 | " | " | 12800 | 0.0744 |
| | Step III | styrene | " | 35 | " | " | 8100 | ?? |
| 24219-87 | Step I | butadiene | N | 55 | Y | 0.5 | 6796 | 0.0577 UV |
| | Step II | styrene | " | " | " | " | 10473 | 0.1138 UV |
| | Step III | butadiene | " | " | " | " | 10800 | 0.0825 UV |
| 24219-89 | Step I | butadiene | N | 55 | N | 0 | 6451 | 0.0575 |
| | Step II | styrene | " | " | " | " | 12106 | 0.1492 |
| | Step III | butadiene | " | " | " | " | 6200 | 0.0937 |
| 24219-91 | Step I | butadiene | N | 55 | Y | 1.0 | no rxn | no rxn |
| 24219-95 | Step I | butadiene | N | 55 | N | 0 | 5830 | 0.0695 |
| | Step II | styrene | " | " | Y | 0.5 | 14064 | 0.1463 |
| | Step III | butadiene | " | " | " | " | 6900 | 0.0797 |
| 24219-97 | Step I | styrene | N | 55 | N | 0 | 6041 | 0.1739 |
| | Step II | butadiene | " | " | Y | 0.5 | 8039 | 0.0828 |
| | Step III | styrene | " | " | " | " | 6500 | 0.0785 |
| 24219-107 | Step I | styrene | N | 55 | N | 0 | 5201 | 0.1826 |
| | Step II | butadiene | " | 55 | Y | 1.0 | 8744 | 0.0582 |
| 24219-109 | Step I | butadiene | N | 55 | N | 0.0 | 4582 | 0.0742 |
| | Step II | styrene | " | " | Y | 1.0 | no rxn | no rxn |
| 24219-111 | Step I | styrene | N | 55 | Y | 1.0 | 7678 | 0.1424 |
| 24219-113 | Step I | butadiene | N | 55 | Y | 1.0 | 5804 | 0.026 |
| 24219-115 | Step I | styrene | N | 55 | Y | 1.0 | 9864 | 0.0388 |
| 24219-117 | Step I | styrene | N | 55 | N | 0.0 | 5111 | 0.4538 |
| | Step II | styrene/butadiene (40/60) | " | " | " | " | 4766 | 0.0699 |
| 24219-119 | Step I | styrene | N | 55 | N | 0.0 | 5883 | 0.3662 |
| | Step II | styrene/butadiene (50/50) | " | " | Y | 0.5 | 4666 | 0.0708 |
| 24219-121 | Step I | styrene | N | 55 | N | 0.0 | 6326 | 0.1389 |
| | Step II | styrene/butadiene (50/50) | " | " | Y | 1.0 | no rxn | no rxn |
| 24219-123 | Step I | styrene | N | 35 | Y | 1.0 | no rxn | no rxn |

Example 3

Representative Procedure for Preparation of a Diinitiated Butadiene Polymer at 20% Solids in a 2 l. Glass Autoclave and Capping with EO after adding Trialkyaluminum Diinitiator solutions were prepared by adding s-butyllithium to a solution of diisopropenyl benzene in cyclohexane and ether. The active concentration of the initiator was determined to be 0.48 N by titration. The polymerizations were carried out in a 2 liter Buchi glass autoclave which made any color or viscosity changes easy to observe. wt. triethylaluminum solution was added, and allowed to react with the living chain ends for 15 minutes. The reaction was exothermic enough to raise the temperature a few degrees. The yellow color of the polymer anion persisted, but the solution viscosity decreased noticeably, especially at higher polymerization solids. After 15 minutes, 6 grams of ethylene oxide charge was added and flushed in with about 44 grams of cyclohexane from a bomb attached above it, as described in the previous example, resulting in a temperature increase of a few degrees and a decrease in the color of the solution, but no increase in the viscosity. After 30 minutes, methanol was added to terminate the reaction. Details of this and other experiments are summarized in Table 2.

TABLE 6

Synthesis Conditions for Preparation of Diinitiated Butadiene Polymers and Capping with EO After Addition of Trialkylaluminum.

| Sample # | solids | Poly DiLi | [DiLi] (N) | RLi | $R_3Al$ | Capping Reaction TEA:Li | $t_{n/n}$ (min) | EO/Li | DEP |
|---|---|---|---|---|---|---|---|---|---|
| 23749-75 | 5% | 23749-33 | 0.48 | s-BuLi | None | 0:1 | na | 1.49 | Y |
| 23749-79 | 5% | 23749-33 | 0.48 | s-BuLi | TEA | 1:1 | 15 | 1.34 | Y |
| 23749-81 | 5% | E6253S | 0.56 | s-BuLi | TEA | 0.67:1 | 15 | 1.44 | Y |
| 23749-83 | 5% | E6253S | 0.56 | s-BuLi | TEA | 0.33:1 | 15 | 1.44 | Y |
| 21452-175 | 10% | 21452-173 | 0.35 | s-BuLi | TEA | 1:1 | 15 | 1.26 | N |
| 21452-185 | 10% | 21452-185 | (1) | s-BuLi | None | 0:1 | na | 4.4 | N |
| 21452-189 | 30% | 21452-189 | (1) | s-BuLi | None | 0:1 | na | 3.3 | N |
| 23749-85 | 10% | E6253S | 0.56 | s-BuLi | TEA | 1:1 | 15 | 1.47 | Y |
| 23749-87 | 10% | E6253S | 0.56 | s-BuLi | TEA | 0.67:1 | 15 | 1.58 | Y |
| 23749-89 | 10% | E6253S | 0.56 | s-BuLi | TEA | 0.33:1 | 15 | 1.52 | Y |
| 23749-97 | 30% | E6269S | 0.52 | s-BuLi | TEA | 1:1 | 15 | 1.6 | Y |
| 23749-101 | 30% | E6269S | 0.52 | s-BuLi | TEA | 0.67:1 | 15 | 1.56 | Y |
| 23749-113 | 20% | 23749-111 | 0.42 | s-BuLi | TEA | 1:1 | 15 | 1.26 | Y |
| 22930-99A | 20% | 167 | 0.49 | t-BuLi | TEA | 1:1 | 15 | 3.08 | N |
| 22930104C | 20% | 7 | 0.57 | t-BuLi | TEA | 1:1 | 15 | 2.43 | N |
| 22930-105A | 20% | 7 | 0.57 | t-BuLi | TEA | 1:1 | 15 | 3.21 | N |
| 22930-107B | 20% | 9 | 0.5 | t-BuLi | TEA | 1:1 | 15 | 2.41 | N |
| 22930-91A | 10% | 149 | 0.38 | s-BuLi | TMAL[1] | 1:1 | 15 | 3.01 | N |
| 22930-102A | 20% | 199 | 0.52 | s-BuLi | TEA | 1:1 | 15 | 2.58 | N |
| 22930-103A | 20% | 191[2] | 0.61 | s-BuLi | TEA | 1:1 | 15 | 2.54 | N |
| 22930-109B | 10% | 6086 | 0.57 | s-BuLi | TEA | 1:1 | 15 | 1.47 | N |
| 23838-13 | 10% | 33 | 0.48 | s-BuLi | TEA | 1:1 | 15 | 1.38 | N |
| 23838-16 | 10% | 33 | 0.48 | s-BuLi | TEA | 1:1 | 15 | 1.58 | N |
| 23838-20 | 10% | 33 | 0.48 | s-BuLi | TEA | 1:1 | 15 | 1.32 | N |
| 23838-22 | 10% | 33 | 0.48 | s-BuLi | TEA | 1:1 | 15 | 1.52 | N |
| 23838-24 | 20% | 33 | 0.48 | s-BuLi | TEA | 1:1 | 15 | 1.37 | N |
| 23838-26 | 10% | 33 | 0.48 | s-BuLi | TEA | 1:1 | 15 | 1.35 | N |
| 23838-28 | 10% | 33 | 0.48 | s-BuLi | TEA | 1:1 | 15 | 1.47 | N |
| 23838-30 | 10% | 6253 | 0.52 | s-BuLi | TEA | 1:1 | 15 | 1.38 | N |
| 23838-32 | 10% | 6253 | 0.52 | s-BuLi | TEA | 1:1 | 1.24 | N |
| 23838-34 | 10% | 6253 | 0.52 | s-BuLi | TEA | 1:1 | 15 | 1.59 | N |
| 23838-36 | 10% | 6253 | 0.52 | s-BuLi | TEA | 1:1 | 15 | 1.17 | N |
| 23838-38 | 10% | 6253 | 0.52 | s-BuLi | TEA | 1:1 | 15 | 1.29 | N |
| 23838-40 | 10% | 6253 | 0.52 | s-BuLi | TEA | 1:1 | 15 | 1.39 | N |
| 23838-43 | 10% | 6253 | 0.52 | s-BuLi | TEA | 1:1 | 15 | 1.38 | N |

(1) made in situ in autoclave
[1]Trimethylaluminum
[2]Triethylamine used in initiator synthesis instead of DEE.

Comparative Example 4

Polymerization in a 2 1. Glass Autoclave and Capping with EO after adding Diethylzinc or Dibutylmagnesium.

Butadiene was polymerized at 20% solids using an initiator prepared from t-butyllithium and diisopropenyl benzene. After the polymerization was complete, one mole of diethylzinc was added per mole of lithium. As with trialkylaluminum, the viscosity of the living polymer solution decreased, while the color remained essentially unchanged.

We claim:

1. An organometallic compound prepared by the process of contacting anionically polymerizable monomers with a mono- or multi-functional anionic polymerization intitiator which is an organo-substituted alkali metal compound and adding at least 0.01 equivalents of a metal alkyl compound per equivalent of living polymer chain ends, wherein the alkyl groups of the metal alkyl compound are chosen so that they will not exchange with the living polymer chain ends.

2. The organometallic compound of claim 1, wherein from 0.01 to 1.5 equivalents of the metal alkyl compound per equivalent of living polymer chain ends is added.

3. The organometallic compound of claim 1, wherein from 0.01 to 1.0 equivalents of the metal alkyl compound per equivalent of living polymer chain ends is added.

4. The organometallic compound of claim 1, wherein the metal alkyl compound is selected from the group consisting of aluminum, zinc, boron, and magnesium alkyls having from 1 to 20 carbon atoms per alkyl substituent.

5. The organometallic compound of claim 4, wherein the metal alkyl compound is selected from the group consisting of triethylaluminum, trimethylaluminum, tri-n-propylaluminum, tri-n-butylaluminum, triisobutylaluminum, tri-n-hexylaluminum, trioctylaluminum, butylethyl-magnesium, di-n-butylmagnesium, di-n-hexylmagnesium, dimethylzinc, diethylzinc, di-n-propylzinc, diisobutylzinc, and di-n-butylzinc.

6. The organometallic compound of claim 5, wherein the metal alkyl is triethyl aluminum.

7. The organometallic compound of claim 1, wherein the organo substituent of the alkali metal compound is aliphatic, cycloaliphatic, aromatic, or alkyl-substituted aromatic.

8. A living anionically polymerized polymer prepared by the process of contacting anionically polymerizable monomers with a mono- or multi-functional anionic polymerization intitiator which is an organo-substituted alkali metal compound and adding at least 0.01 equivalents of a metal alkyl compound per equivalent of living polymer chain ends, wherein the alkyl groups of the metal alkyl compound are chosen so that they will not exchange with the living polymer chain ends and wherein at least some of the living chain ends are an adduct of the alkali metal polymer chain end with a metal alkyl.

9. The living anionically polymerized polymer of claim 8, wherein from 0.01 to 1.5 equivalents of the metal alkyl compound per equivalent of living polymer chain ends is added.

10. The living anionically polymerized polymer of claim 8, wherein from 0.01 to 1.0 equivalents of the metal alkyl compound per equivalent of living polymer chain ends is added.

11. The living anionically polymerized polymer of claim 8, wherein the metal alkyl compound is selected from the group consisting of aluminum, zinc, boron, and magnesium alkyls having from 1 to 20 carbon atoms per alkyl substituent.

12. The living anionically polymerized polymer of claim 8, wherein the metal alkyl compound is selected from the group consisting of triethylaluminum, trimethylaluminum, tri-n-propylaluminum, tri-n-butylaluminum, triisobutylaluminum, tri-n-hexylaluminum, trioctylaluminum, butylethyl-magnesium, di-n-butylmagnesium, di-n-hexylmagnesium, dimethylzinc, diethylzinc, di-n-propylzinc, diisobutylzinc, and di-n-butylzinc.

13. The living anionically polymerized polymer of claim 12, wherein the metal alkyl is triethyl aluminum.

14. The living anionically polymerized polymer of claim 8, wherein the organo substituent of the alkali metal compound is aliphatic, cycloaliphatic, aromatic, or alkyl-substituted aromatic.

15. An organometallic compound prepared by the process of contacting anionically polymerizable monomers with a mono- or multi-functional anionic polymerization initiator which is an organo-substituted alkali metal compound and adding at least 0.01 equivalents of a metal alkyl compound per equivalent of living polymer chain ends wherein the alkyl groups of the metal alkyl compound are chosen so that they will not exchange with the living polymer chain ends.

* * * * *